United States Patent [19]

Chen et al.

[11] Patent Number: 4,906,383

[45] Date of Patent: Mar. 6, 1990

[54] NOVEL AMINE-CONTAINING COPOLYMERS AND THEIR USE

[75] Inventors: Fu Chen, Newtown; William S. Carey, Ridley Park, both of Pa.

[73] Assignee: Betz Laboratories, Inc., Trevose, Pa.

[21] Appl. No.: 215,100

[22] Filed: Jul. 5, 1988

Related U.S. Application Data

[63] Continuation-in-part of Ser. No. 37,484, Apr. 13, 1987, Pat. No. 4,759,851, which is a continuation of Ser. No. 864,049, May 16, 1986, Pat. No. 4,659,481, which is a continuation of Ser. No. 545,563, Oct. 26, 1983, abandoned.

[51] Int. Cl.$^4$ ............................................. C02F 5/14
[52] U.S. Cl. .................................... 210/697; 210/700; 210/701; 252/180; 252/181; 162/168.2; 162/199; 162/DIG. 4
[58] Field of Search ............................. 210/697–701; 252/180, 181; 526/312; 162/168.2, 199, DIG. 4

[56] References Cited

U.S. PATENT DOCUMENTS

| | | | |
|---|---|---|---|
| 2,634,296 | 4/1953 | Morris et al. | 568/648 |
| 2,723,971 | 11/1955 | Cupery | 525/60 |
| 2,847,477 | 8/1958 | Watanabe et al. | 568/626 |
| 2,847,478 | 8/1958 | Hwa et al. | 568/626 |
| 3,228,979 | 1/1966 | Gaertner | 260/512 R |
| 3,262,903 | 7/1966 | Robertson | 260/37 |
| 3,331,773 | 7/1967 | Gunderson et al. | 210/701 |
| 3,549,548 | 12/1970 | Newman | 252/181 |
| 3,706,717 | 12/1972 | Siegele | 210/701 |
| 3,799,893 | 3/1974 | Quinlan | 260/2 BP |
| 3,891,568 | 12/1975 | Nishio et al. | 422/15 |
| 3,989,636 | 11/1976 | Domba | 252/180 |
| 3,992,318 | 11/1976 | Gaupp et al. | 252/389 |
| 4,018,702 | 4/1977 | Boffardi | 252/389 |
| 4,029,577 | 6/1977 | Godlewski et al. | 210/701 |
| 4,046,707 | 9/1977 | Smith et al. | 252/180 |
| 4,095,029 | 6/1978 | Fields | 560/87 |
| 4,149,969 | 4/1979 | Robitaille et al. | 252/181 |
| 4,176,059 | 11/1979 | Suzuki | 210/698 |
| 4,207,405 | 6/1980 | Masler et al. | 525/328 |
| 4,209,398 | 6/1980 | Ii et al. | 252/180 |
| 4,288,327 | 7/1986 | Godlewski et al. | 210/698 |
| 4,303,568 | 12/1981 | May et al. | 422/13 |
| 4,324,684 | 4/1982 | Geiger et al. | 252/389 |
| 4,432,879 | 2/1984 | Greaves et al. | 210/699 |
| 4,457,847 | 12/1987 | Lorenc | 210/698 |
| 4,469,615 | 9/1984 | Tsuruoka et al. | 252/180 |
| 4,490,308 | 12/1985 | Fong et al. | 260/513 |
| 4,500,693 | 2/1985 | Takehara et al. | 526/240 |
| 4,546,156 | 10/1985 | Fong et al. | 526/240 |
| 4,560,481 | 12/1985 | Hollander | 210/697 |
| 4,575,425 | 3/1986 | Boffardi et al. | 210/697 |
| 4,640,793 | 2/1987 | Persinski | 210/700 |
| 4,650,591 | 3/1987 | Boothe et al. | 210/700 |
| 4,659,480 | 4/1987 | Chen | 210/697 |
| 4,659,481 | 4/1987 | Chen | 210/697 |
| 4,659,482 | 4/1987 | Chen | 210/699 |
| 4,671,880 | 6/1987 | Wisener et al. | 210/699 |
| 4,678,840 | 7/1987 | Fong et al. | 525/340 |
| 4,701,262 | 10/1987 | Chen | 210/699 |
| 4,708,815 | 11/1987 | Chen | 252/181 |
| 4,717,499 | 1/1988 | Chen | 252/181 |
| 4,732,698 | 3/1988 | Chen | 252/181 |
| 4,759,851 | 7/1988 | Chen | 210/697 |

FOREIGN PATENT DOCUMENTS

| | | |
|---|---|---|
| 0142929 | 5/1985 | European Pat. Off. . |
| 2522637 | 12/1976 | Fed. Rep. of Germany . |
| 53-075138 | 7/1978 | Japan . |
| 56-155692 | 12/1981 | Japan . |
| 58-7415 | 1/1983 | Japan . |
| 58-9987 | 1/1983 | Japan . |
| 58-147412 | 9/1983 | Japan . |
| 58-154761 | 9/1983 | Japan . |
| 58-171576 | 10/1983 | Japan . |
| 59-135202 | 8/1984 | Japan ............................ 526/312 |
| 1491701 | 11/1977 | United Kingdom . |

OTHER PUBLICATIONS

Chemical Abstract-78:16850y, 1973; 85:20537p, 1974; 98:203736r, 1983; 99:58708x, 1983.
Alcolac Technical Literature.
Corrosion, vol. 2, Shrier., 1976.

*Primary Examiner*—Peter Hruskoci
*Attorney, Agent, or Firm*—Alexander D. Ricci; Gregory M. Hill

[57] ABSTRACT

This invention relates to novel polymeric compositions which are useful for water treatment. These novel compositions are comprised of polymers of $\alpha$, $\beta$ ethylenically unsaturated monomer(s), preferably containing carboxylic acid or carboxylic amide functionalities, and amine-containing allyl ether monomers.

28 Claims, No Drawings

NOVEL AMINE-CONTAINING COPOLYMERS AND THEIR USE

This application is a continuation-in-part of U.S. Ser. No. 037,484 filed Apr. 13, 1987, now U.S. Pat. No. 4,759,851 which is a continuation of Ser. No. 864,049 filed May 16, 1986 (now U.S. Pat. No. 4,659,481), which in turn is a continuation of Ser. No. 545,563 filed Oct. 26, 1983 (now abandoned).

FIELD OF THE INVENTION

This invention relates to novel polymeric compositions which are useful for water treatment. These novel compositions are comprised of polymers of $\alpha,\beta$ ethylenically unsaturated monomer(s), preferably containing carboxylic acid or carboxylic amide functionalities, and amine-containing allyl ether monomers.

BACKGROUND OF THE INVENTION

The present invention is directed to novel polymeric compositions containing pendant functional groups. The polymers are useful for a broad range of water treatment applications. They can be used to control the formation and deposition of scale imparting compounds in water systems such as cooling, boiler, gas scrubbing, and pulp and paper manufacturing systems. They will also find utility as corrosion inhibitors, as well as functioning as chelating agents for various metallic ions in solution.

As described comprehensively in U.S. Pat. No. 4,497,713, scaling and corrosion in cooling waters is a major problem. The term "cooling water" is applied wherever water is circulated through equipment to absorb and carry away heat. This definition includes air conditioning systems, engine jacket systems, refrigeration systems, as well as the multitude of industrial heat exchange operations.

In a cooling water system employing a cooling tower, water is circulated through the heat transfer equipment and subsequently cooled by evaporation of a part of the circulating water as the water is passed over the cooling tower. By virtue of the evaporation which takes place in cooling, the dissolved and suspended solids in the water become concentrated. The circulating water becomes more concentrated than the make-up water due to this evaporation loss.

The make-up water employed for recirculating systems is obtained from surface or well water sources. These waters normally contain a variety of dissolved salts, the abundance and composition of which depend on the source of the water. Generally the make-up water will contain a preponderance of the alkaline earth metal cations, primarily calcium and magnesium, and sometimes iron, and such anions as silicate, sulfate, bicarbonate, and carbonate. As the water is concentrated by the evaporative process, precipitation of a salt will occur whenever the solubility of the particular cation/anion combination is exceeded. If the precipitation occurs at a metal surface, and adheres to it, the resultant deposit is referred to as scale. Some of the factors which affect scale are temperature, rate of heat transfer, water velocity, dissolved solids concentration, cycles of concentration, system retention, and pH of the water.

Preventing the corrosion and scaling of industrial heat transfer equipment is essential to the efficient and economical operation of a cooling system.

Excessive corrosion of metallic surfaces can cause the premature failure of process equipment, necessitating downtime for the repair or replacement.

In addition, the buildup of corrosion products on heat transfer equipment impedes water flow and reduces heat transfer efficiency, thereby limiting production or requiring downtime for cleaning. Reduction in efficiency will also result from scaling deposition which retards heat transfer and hinders water flow.

Scale can also cause rapid localized corrosion and subsequent penetration of metallic surfaces through the formation of differential oxygen concentration cells. The localized corrosion resulting from differential oxygen cells originating from deposits is commonly referred to as "under-deposit corrosion."

With regard to boiler systems, and as described comprehensively in U.S. Pat. No. 4,288,327, the formation of scale and sludge deposits on boiler heating surfaces is the most serious water problem encountered in steam generation. Although external treatment is utilized in an attempt to remove calcium and magnesium ions from the feed water, scale formation due to residual hardness (calcium and magnesium salts) is normally experienced. Accordingly, internal treatment is necessary to prevent, reduce, or inhibit formation of the scale-imparting compounds and their deposition.

Other scale-forming species (phosphate, sulfate, and silicate salts, for example) can form complex insoluble salts, depositing as boiler scale.

Therefore, there is a need in industrial water treatment for materials which can prevent or inhibit the formation of scale and deposits on heat transfer surfaces in boiler systems, and the like.

DESCRIPTION OF THE PRIOR ART

Domba, U.S. Pat. No. 3,989,636, describes novel amino acid-epihalohydrin copolymers with chelating properties. These polymers differ chemically from those of the present invention. The '636 polymers are of the condensation type, whereas the instant polymers are prepared by addition polymerization. This results, in the case of the instant invention, in polymeric chains containing a carbon backbone, whereas in the '636 patent, a backbone containing nitrogen atoms is produced. The molecular weights contemplated by the '636 patent are furthermore well outside the molecular weight range of the novel polymers of the present invention. In addition, the instant polymers are significantly more effective as scale control agents in boiler water treatment, since they reduce scale more effectively than the '636 polymers at dosages far lower than the specific '636 polymers described.

Quinlan, U.S. Pat. No. 3,799,893, describes phosphorous containing compounds which are described as useful for inhibiting scale formation. The compounds described are methylene phosphonates of glycidyl reacted polyalkylene polyamines. These materials are chemically significantly different from the instant polymers: the '893 compounds do not contain carboxylic acid groups; the '893 best mode compounds are not polymers; and, the '893 compounds have nitrogen in the backbone of the structure. For these reasons, the '893 compounds are not considered to be pertinent prior art. Furthermore, although the test conditions for determining scale inhibition are substantially different in '893 and the instant invention, the instant polymers appear to be more effective in scale inhibition at substantially lower dosages than the best mode '893 compounds.

Boffardi, et. al., U.S. Pat. No. 4,018,702 disclose scale and corrosion inhibiting compositions which comprise amine adducts of polymaleic anhydride. The instant invention differs from the '702 patent in a number of significant aspects. The '702 polymers are amides, whereas in the instant invention the amine group is attached to the polymeric chain through a hydrogen-substituted carbon. The instant polymers are significantly more stable in an aqueous environment than the '702 polymers, which would be expected to lose the amine functionality from the polymer chain through hydrolysis. Such hydrolysis is difficult with the instant polymers. Furthermore, the best mode polymers of the '702 patent have a molecular weight of only about 200–300 (Example 1 of '702, the only disclosed example of the preparation of polymer). The molecular weights of the present polymer fall within the range of about 1,000 to about 1,000,000, with the most preferred range being from about 1,500 to about 25,000. Thus, the instant polymers are well outside the range of the '702 polymers. Therefore, the '702 polymers are not considered to be pertinent prior art to the instant invention.

D'Alelio, et. al., Journal of Macromolecular Science-Chemistry, Vol. A6, pp. 513–567 (1972) report on the synthesis and chelating properties of low molecular weight poly(glycidyl methacrylate) reacted with iminoacetic and iminodiacetic acids. Although the D'Alelio polymers have structural similarities to the instant polymers, they are nonetheless chemically distinct. Significantly, the D'Alelio polymers are ester derivatives and suffer from the same hydolytic instability as the '702 compounds. Polymers of the instant invention are stable to hydrolysis in aqueous medium. Therefore, the D'Alelio reference is not considered pertinent prior art to the instant invention.

Lorenc, U.S. Pat. No. 4,457,847, cites the use of carboxyl containing sequestrant polymers to treat hardness in boiler waters to prevent or remove scale formation on heat transfer surfaces.

DETAILED DESCRIPTION OF THE INVENTION

This invention pertains to novel water-soluble copolymers which contain pendant functional groups. Specifically, the novel copolymers of the invention have the structure of Formula I:

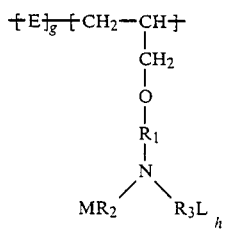

FORMULA I wherein E in the above formula is the repeat unit remaining after polymerization of a polymerizable monomer, containing pendant carboxylic acid or water-soluble salts thereof, carboxylic amide, lower alkyl (C1-C6) ester, or lower (C1-C6) alkyl hydroxylated ester of such carboxylic acids. Compounds encompassed by E in Formula I include polymerized acrylic acid, methacrylic acid, acrylamide, maleic acid or anhydride, itaconic acid, and the like.

It is contemplated that E in Formula I also encompasses mixtures of monomers, provided that they fall within the definition of E given above. One such preferred mixture of monomers is acrylic acid/hydroxypropylacrylate.

$R_1$ in Formula I is an unsubstituted linear or branched lower alkylene group having from about 1 to about 6 carbon atoms, or an hydroxyl substituted linear or branched lower alkylene group having from about 1 to about 6 carbon atoms. $R_2$ and $R_3$ are chosen independently from hydrogen, lower alkylene group containing from about 1 to about 5 carbon atoms, hydroxyl substituted lower alkylene group having from about 1 to about 5 carbon atoms, or carboxyl substituted lower alkylene group having from about 1 to about 5 carbon atoms. The above substituents are preferred, but other substituents on the nitrogen capable of chelation are also contemplated. These groups include, but are not limited to, phosphonic acid groups, sulfonic acid groups, and the like.

M and L independently denote hydrogen or a water-soluble cation, e.g., ammonium, alkali metal, organic aminium ion, and the like. It will be readily apparent to those skilled in the art that M and L will be cations only when $R_2$ and $R_3$ contain groups requiring a cation for electrical neutrality, such as carboxyl, phosphonic, or sulfonic acid groups.

The molar ratio of monomers (g:h) in Formula I may fall within the range of 20:1 to 1:10, with a molar ratio (g:h) of about 10:1 to 1:5 being preferred. It is to be understood that molecular weight of the novel copolymers is less a key criterion than that the copolymers be water-soluble. Nonetheless, the number-average molecular weight of the novel water-soluble copolymers of Formula I may fall within the range of 1,000 to 1,000,000, with the number average molecular weight within the range of about 1,500 to about 500,000 being preferred, and the number-average molecular weight within the range of about 1,500 to about 25,000 being most preferred.

The preparation of the monomer(s) designated as (g) in Formula I may be in accordance with well known techniques. For instance, one such possible monomer, acrylic acid, may be prepared by hydrolysis of acrylonitrile or by oxidation of acrolein.

The allyl ether monomer, represented by fragment (h) of Formula I, may be prepared by a ring-opening reaction of an allylic glycidyl ether with ammonia, primary, secondary, or tertiary amines. The ring-opening reaction of amines with the epoxide group of the allylic glycidyl ether is analogous to the ring-opening reaction of allylic glycidyl ethers with reagents such as bisulfites or phosphorous acid, to give sulfonic acids, or salts thereof, or phosphites, respectively, as described thoroughly in Chen, U.S. Pat. Nos. 4,659,481 and 4,659,480. When $R_1$ in Formula I is $-CH_2-CHOH-CH_2-$, the allylic glycidyl ether precursor is allyl glycidyl ether (AGE), the preferred allylic glycidyl ether. The reaction is illustrated with AGE and a secondary amine:

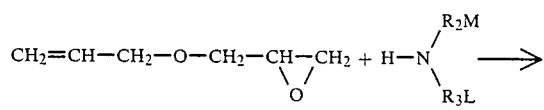

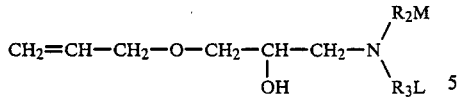

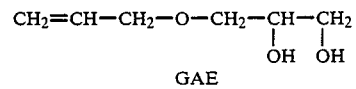

AGE will be used hereinafter as the illustrative allylic glycidyl ether for the sake of simplicity, but its use hereinafter is not to be construed as limiting the invention in any way. For example, a methallylic glycidyl ether will also be useful in the present invention.

In the above equation, $R_2$, $R_3$, M, and L have the same meaning as delineated in Formula I. The following amines, among others, may be employed in the above reaction: ammonia, methylamine, ethylamine, dimethylamine, diethylamine, propylamine, n-butylamine, isopropylamine, isobutylamine, ethanolamine, propanolamine, etc. It is to be understood that the enumeration of the above amines in no way limits the utility of the present invention. Those skilled in the art would recognize the myriad amines which could be utilized to synthesize monomers that would be useful for the present invention.

It is also to be understood that when a tertiary amine is used to synthesize the amine-containing monomer in the above reaction, the third group attached to the nitrogen will be either R2M or R3L, and one equivalent of an inorganic acid, preferably hydrogen chloride, would be needed to achieve a stable product, which in the case of a tertiary amine would be a quaternary ammonium salt. The quaternary ammonium salt would have a permanent positive charge independent of pH. The inorganic acid, preferably hydrogen chloride, needed when a tertiary amine is used could be in any of its readily available forms, i.e., gaseous, aqueous solution, etc.

The carboxylate-containing amines include, but are not limited to, aspartic acid, glycine, sarcosine (n-methyl glycine), iminodiacetic acid (IDA), hydroxyethylglycine, etc. The amines containing carboxylic acids can be utilized in the acid or the salt form. If desired in the salt form, the carboxylic acids are preferably converted to their water-soluble salts with ammonia, organic amines, caustic soda, and the like (as indicated by M and L in Formula I) prior to reaction with the AGE, but the neutralization could also be conducted after the reaction with the AGE, or even after the subsequent polymerization.

The ring opening reaction may be carried out in the absence of solvent, or in a suitable solvent, with water being preferred. The reaction temperature may range from 0° C. to 80° C. Alkaline materials can be used in catalytic amounts to speed the reaction, or to drive the reaction to completion. Preferred as the alkaline material is caustic soda, caustic potash, or soda ash.

During the ring opening reaction, trace amounts of the glyceryl compound may be formed. This can usually be controlled to less than 5 mole %, and is due to hydrolysis of the AGE according to the equation:

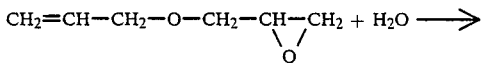

AGE

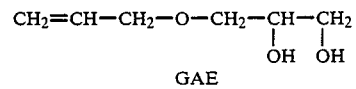

If desired, the hydrolysis product (glyceryl allyl ether, GAE) may be removed from the mixed monomer solution via the conventional techniques such as distillation, solvent extraction, and the like. It is to be understood that the method of removal of this or other impurities, do not in any way limit the practice of our invention. In any case, such methods will be known to those skilled in the art.

The present inventors prefer to utilize the monomer containing the impurities, if any, as it is produced. It may therefore contain minor amounts of GAE. When the GAE is not separated prior to polymerization, it will be incorporated into the polymer along with the primary amine component.

It is to be understood that the above methods of synthesis of the amine containing monomer do not limit the methods of preparation of the said monomer.

After the desired monomers are produced, and isolated if desired, polymerization is conducted. Radical initiation is the preferred means of initiation, and the polymerization may be conducted in any of the media familiar to those skilled in the art, such as solution, suspension, bulk, or emulsion techniques. Any of the well known initiators may be used to polymerize the monomers, such as azo compounds, peroxides, redox couples, persulfates, and the like. Likewise, any of the chain transfer agents familiar to those skilled in the art may be used to control molecular weight. These include, but are not limited to, lower alkyl alcohols such as isopropanol, amines, mercaptans, and the like. Accelerators such as bisulfite or ascorbic acid may also be used. It is to be understood that the aforementioned polymerization methods do not in any way limit the synthesis of polymers useful in our invention. Similarly, the tertiary structure (tacticity, arrangement of monomers in the polymer chain, etc.) of the polymers is not limiting to our invention.

The formation of polymers was confirmed by the following techniques: viscosity increase; gel permeation chromatography; and carbon-13 nuclear magnetic resonance (NMR) spectroscopy. The carbon-13 NMR spectra show the typical broad, polymer-type backbone, with a complex C-C region (35-47 ppm) and C-O-C region (70-75 ppm), with either a trace or no unreacted monomers. Preferred polymers according to our invention are copolymers of the sodium salt of acrylic acid with allyloxyhydroxypropylamino components having the structure of Formula II:

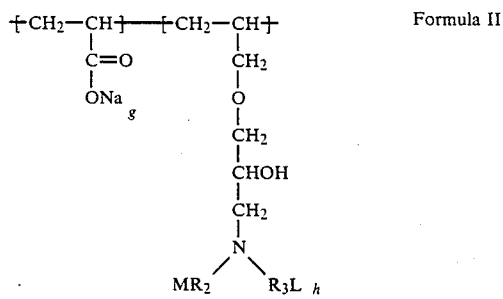

Formula II wherein the identity of $R_2$, $R_3$, M and L for the preferred copolymers are as shown in Table I.

TABLE 1

Structures of the Copolymers

| Copolymer Example | $R_2$ | $R_3$ | M | L | Mn |
|---|---|---|---|---|---|
| 8 | $CH_2$ | $CH_2CH_2COO/H^*$ | H | Na/— | 2,350 |
| 9 | $CH_2$ | $CH_2CH_2COO/H^*$ | H | Na/— | 3,200 |
| 10 | $CH_2$ | $CH_2$ | H | H | 2,469 |
| 11 | $CH_2$ | $CH_2$ | H | H | 2,350 |
| 12 | $CH_2COO$ | $CH_2COO$ | Na | Na | 4,450 |
| 13 | $CH_2$ | $CH_2COO$ | H | Na | 4,200 |
| 14 | $CH_2CH_2COO$ | $CH_2CH_2COO$ | Na | Na | 7,000 |

*Results from addition reaction of amino component to acrylic acid, giving terpolymers. For details, see Examples 8 and 9.

Mn, number average molecular weight, was measured by gel permeation chromatography (GPC) using Toyo Soda G-2000 SW or G-4000 SW columns calibrated with polystyrene sulfonate standards in sodium nitrate solution. Molecular weight resuls from GPC depend on the type of column, conditions and standards used.

Also preferred are copolymers of sodium methacrylate with allyloxyhydroxy propylamino components (Example 15).

Most preferred are copolymers of acrylic acid with glycine, N-(carboxymethyl)-N-[2-hydroxy-3-(2-propenyloxy)propyl], disodium salt (wherein MR2 and R3L in Formula II are both $-CH_2-COONa$), and copolymers of methacrylic acid with 2-propanol, 1-(diethylamino)-3-(2-propenyloxy), (wherein MR2 and R3L in Formula I are both $-CH2-CH3$).

The copolymers of the instant invention may be used alone or in combination with other additives to inhibit corrosion and control the formation and deposition of scale imparting compounds in water systems. However, they are not limited to use in any specific category of water system. For instance, in addition to boiler and cooling water systems, the copolymers may also be effectively utilized in scrubber systems and the like wherein corrosion and/or the formation and deposition of scale forming salts is a problem. Other possible environments in which the invention copolymers may be used are for sea water desalinization and dust collecting systems in iron and steel manufacturing. The copolymers are effective in controlling iron-induced fouling in wells or other groundwater systems. The copolymers will also be effective in scale control in cooling systems containing high levels of alum or ferric chloride.

The copolymers may also be used to prevent precipitation of calcium carbonate, calcium sulfate, calcium phosphate, calcium phosphonate, calcium oxalate, barium sulfate, zinc hydroxide, aluminum hydroxide, aluminum oxide, iron oxide, iron hydroxide, ferric chloride, etc. in water systems. They will also be useful, for example, as pigment dispersants, cement dispersants, builders in detergents, and mineral beneficiation aids as in iron, copper, molbydate mining, etc.

The copolymers of the present invention can also be used with other components in order to enhance the corrosion inhibition and scale controlling properties thereof. For instance, the copolymers may be used in combination with one or more kinds of compounds selected from the group consisting of inorganic phosphates, phosphonic acid salts, organic phosphoric acid esters, and polyvalent metal salts such as those from zinc, chromate, molybdate, and nickel.

The copolymers may be used in combination with conventional corrosion inhibitors for iron, steel, copper, copper alloys, or other metals, conventional scale and contamination inhibitors, metal ion sequestering agents, and other conventional water treating agents.

Exemplary corrosion inhibitors comprise chromates, bichromates, tungstates, molybdates, nitrites, borates, silicates, oxycarboxylic acids, amino acids, catechols, aliphatic amino surface-active agents, benzotriazole, and mercapto benzothiazole.

Scale and contamination inhibitors include lignin derivatives, tannic acids, starches, polyacrylic acids, acrylic acid/hydroxyalkylacrylate copolymers, and acrylic acid/allyloxyhydroxypropylsulfonate copolymers.

Metal ion sequestering agents include ethylenediamine, diethylenetriamine, and the like, and polyaminocarboxylic acids including nitrilotriacetic acid, ethylenediaminetetraacetic acid, diethylenetriaminepentaacetic acid, and hydroxyethylethylenediaminetriacetic acid.

Synergistic effects may occur when the copolymers disclosed in this invention are used in combination with the reagents described above.

The novel water soluble copolymers of our invention may contain pendant functional amino carboxylic acid groups. These functional groups are connected to the polymer backbone through the hydrolytically and thermally stable ether linkage. These copolymers have shown unique properties in controlling iron deposition and preventing precipitation of calcium phosphate and calcium carbonate in aqueous systems. The novel copolymers should also find particularly useful application in boiler water treatment, whereby their chelating abilities will allow a reduced dosage of chelating agents, which are commonly used in boiler treatment programs. Furthermore, the presence of the chelating group permanently attached to a polymer chain will minimize the possible corrosion caused by non-bonded chelating agents in various parts of the boiler systems, where corrosion caused by chelating agents could be a problem. The invention is further illustrated by the following specific, but not limiting, examples.

EXAMPLES

Examples 1–7 illustrate the synthesis of the monomers, and Examples 8–15 illustrate synthesis of the copolymers. The monomers of Examples 3 and 4 have not been previously described, and thus have no CAS Registry No. Likewise, the novel copolymers do not have CAS Registry Nos. Examples of the efficacy of the copolymers in aqueous systems are also given.

EXAMPLE 1

Preparation of 2-propanol, 1-(methylamino)-3-(2-propenyloxy) [40987-35-7]

Allyl glycidyl ether (98.5% pure, 196 g, 1.7 mole) was added over a period of 130 minutes to methylamine (40% aqueous solution, 198 g, 2.55 mole), maintaining a reaction temperature of 35±4° C. After addition, the reaction mixture was stirred at 35±1° C. for 30 minutes, then heated at 60±1° C. for 90 minutes. The reaction mixture was then cooled to room temperature. 2-Propanol, 1-(methylamino)-3-(2-propenyloxy) was collected via vacuum distillation at about 95° C./3 mm Hg.

EXAMPLE 2

Preparation of 2-propanol, 1-(dimethylamino)-3-(2-propenyloxy) [78752-11-1]

Allyl glycidyl ether (98.5% pure, 115 g, 1.0 mole) was added over a period of 130 minutes to dimethylamine (60% aqueous solution, 90 g, 1.2 mole), maintaining a reaction temperature of $25\pm2°$ C. After addition, the reaction mixture was stirred at $30\pm3°$ C. for 30 minutes, then heated at $50\pm2°$ C. for 120 minutes. The reaction mixture was then cooled to room temperature. 2-Propanol, 1-(methylamino)-3-(2-propenyloxy) was collected via vacuum distillation at about 73° C./4 mm Hg.

EXAMPLE 3

Preparation of Glycine, N-(carboxymethyl)-N-[2-hydroxy-3-(2-propenyloxy)propyl], disodium salt Iminodiacetic acid (98% pure, 34 g, 0.25 mole) was dispersed in 104 ml DI water at room temperature. Sodium hydroxide (50% aqueous solution, 40 g, 0.5 mole) was added over a period of 60 minutes, maintaining a reaction temperature of $10\pm2°$ C. After addition, the reaction mixture was stirred at room temperature for 60 minutes.

The resulting disodium iminodiacetate solution (24.9%, 169.3 g, 0.238 mole) was added over a period of 85 minutes to a mixture of 34 ml DI water and allyl glycidyl ether (98.5% pure, 27.55 g, 0.238 mole), maintaining a reaction temperature of $27\pm3°$ C. After addition, the reaction mixture was stirred at 30° C. for 70 minutes. Glycine, N-(carboxymethyl)-N-[2-hydroxy-3-(2-propenyloxy)propyl], disodium salt was recovered as a 30% active solution.

EXAMPLE 4

Preparation of glycine, N-methyl-N-[2-hydroxy-3-(2-propenyloxy)propyl], monosodium salt N-methyl glycine (98% pure, 32 g, 0.35 mole) was dispersed in 64 ml DI water at room temperature. Sodium hydroxide (50% aqueous solution, 28 g, 0.35 mole) was added over a period of 80 minutes, maintaining a reaction temperature of $5\pm2°$ C. After addition, the reaction mixture was stirred at room temperature for 60 minutes.

The resulting sodium N-methyl glycinate solution (31.6%, 123 g, 0.348 mole) was added over a period of 70 minutes to a mixture of 33 ml of DI water and allyl glycidyl ether (98.5% pure, 40.3 g, 0.348 mole), maintaining a reaction temperature of $20\pm2°$ C. After addition, the reaction mixture was stirred at 25° C. for 100 minutes. Glycine, N-methyl-N-[2-hydroxy-3-(2-propenyloxy)propyl], monosodium salt was recovered as a 40% active aqueous solution.

EXAMPLE 5

Preparation of 2-Propanol, 1-amino-3-(2-propenyloxy) [6967-44-8]

Allyl glycidyl ether (98.5% pure, 185 g, 1.6 mole) was added over a period of 225 minutes to ammonium hydroxide (26% ammonia in water, 629 g, 9.6 mole), maintaining a reaction temperature of $9\pm3°$ C. After addition, the reaction mixture was stirred at 10° C. for 20 minutes, then room temperature for 45 minutes. 2-Propanol, 1-amino-3-(2-propenyloxy) was collected via vacuum distillation at about 120° C./10 mm Hg.

EXAMPLE 6

Preparation of Beta-alanine, N-(2-carboxyethyl)-N-[2-hydroxy-3-(2-propenyloxy)propyl], disodium salt [74988-14-0]

Methyl acrylate (99% pure, 44.2 g, 0.508 mole) was added over a period of 180 minutes to a mixture of 33 ml methanol and 2-propanol, 1-amino-3-(2-propenyloxy) (99.8% pure, 33.4 g, 0.254 mole), maintaining a reaction temperature of $12\pm3°$ C. After addition, the reaction mixture was stirred at room temperature for 11 hours.

48 ml of methanol was added to the resulting beta-alanine, N-(2-carboxyethyl)-N-[2-hydroxy-3-(2-propenyloxy)propyl], dimethyl ester (75%, 92 g, 0.228 mole), and the reaction mixture was cooled to 15° C. Sodium hydroxide (99% pure, 18.5 g, 0.456 mole) was then dissolved in the reaction mixture, maintaining a reaction temperature below 25° C. After dissolution, the batch was stirred at room temperature for 135 minutes. 100 ml of DI water was then added and an exotherm to 31° C. was observed. The reaction mixture was stirred at 20° C. for 180 minutes, before removing the methanol by vacuum distillation. Beta-alanine, N-(2-carboxymethyl)-N-[2-hydroxy-3-(2-propenyloxy)propyl], disodium salt was recovered at a 56% active aqueous solution.

EXAMPLE 7

Preparation of 2-propanol, 1-(diethylamino)-3-(2-propenyloxy) [14112-80-2]

Allyl glycidyl ether (146 g, 1.25 mole) was added over a period of 120 minutes to a solution of diethylamine (97 g, 1.3 mole) in DI water (33 ml), maintaining a reaction temperature of $30\pm10°$ C. After addition, the batch was stirred at $35\pm5°$ C. for 135 minutes, then room temperature overnight. The batch was then heated at $50\pm2°$ C. for 60 minutes before 2-propanol, 1-(diethylamino) 3-(2-propenyloxy) was collected via vacuum distillation at 98° C./3 mm Hg.

Syntheses of copolymers with acrylic acid are illustrated in Examples 8-14.

EXAMPLE 8

Preparation of acrylic acid/2-propanol, 1-(methylamino)-3-(2-propenyloxy)/beta-alanine, N-methyl-N-[2-hydroxy-3-(2-propenyloxy)propyl], terpolymer 2-Propanol, 1-(methylamino)-3-(2-propenyloxy) (Example 1, 12.6 ), water (114.13 g), and isopropyl alcohol (32.09 g) were charged to a suitable reactor and purged with nitrogen. Sodium persulfate (22% aqueous solution, 15.73 g) and acrylic acid (36.77 g) were simultaneously added over a 4 hour period, maintaining a reaction temperature of $87\pm4°$ C. After addition, the reaction mixture was held at 91° C. for 1 hour. The residual isopropyl alcohol was then removed by azeotropic distillation. Sodium hydroxide (50% aqueous solution, 20 g) and 119 ml of water were then added, maintaining the temperature below 40° C.

Under the polymerization conditions, some addition reaction between the secondary amino hydrogen and the free acrylic acid occurred. This was evidenced by the 13 C NMR spectroscopy which indicated a mole ratio of acrylic acid/2-propanol, 1-(methylamino)-3-(2- propenyloxy)/beta-alanine, N-methyl-N-[2-hydroxy-3-(2-propenyloxy)propyl] of 15.6:1.0:1.9 respectively. This corresponds to about 65% of the available amine forming the adduct with acrylic acid.

EXAMPLE 9

Preparation of acrylic acid/2-propanol, 1-(methylamino)-3-(2-propenyloxy)/beta-alanine, N-methyl-N-[2-hydroxy-3-(2-propenyloxy)propyl]terpolymer Prepared as described in Example 8 except less isopropyl alcohol (19.75 g) and less water (21.59 g) were utilized in the polymerization. This resulted in a higher molecular weight. 13C NMR analysis of the product was similar to that obtained for Example 8, confirming the terpolymer structure.

EXAMPLE 10

Preparation of acrylic acid/2-propanol, 1-dimethylamino)-3-(2-propenyloxy) copolymer Prepared as described in Example 8 utilizing 2-propanol, 1-(dimethylamino)-3-(2-propenyloxy) (Example 2, 13.68 g), water (91.82 g), isopropyl alcohol (21.59 g), sodium persulfate (22% aqueous solution, 16.05 g), and acrylic acid (36.76 g). The hold period after addition was lengthened to 2 hours. After distillation, sodium hydroxide (50% aqueous solution, 20 g) and 119 ml of water were added.

EXAMPLE 11

Preparation of acrylic acid/2-propanol, 1-(dimethylamino)-3-(2-propenyloxy) copolymer Prepared as described in Example 10 utilizing 2-propanol, 1-(dimethylamino)-3-(2-propenyloxy) (Example 2, 20.52 g), water (105.88 g), isopropyl alcohol (22.91 g), sodium persulfate (22% aqueous solution, 18.23 g), and acrylic acid (36.76 g). After distillation, sodium hydroxide (50% aqueous solution, 20 g) and 130 ml of water were added.

EXAMPLE 12

Preparation of acrylic acid/glycine, N-(carboxymethyl)-N-[2-hydroxy-3-(2-propenyloxy)-propyl], disodium salt copolymer Prepared as described in Example 10 utilizing glycine, N-(carboxymethyl)-N-[2-hydroxy-3-(2-propenyloxy)propyl], disodium salt solution (Example 3, 97.04 g), water (105.45 g), isopropyl alcohol (19.54 g), sodium persulfate (22.8% aqueous solution 20 g), and acrylic acid (36.77 g). One hour after addition, tert-butylhydroperoxide (70% aqueous solution, 0.456 g) was added. After distillation, sodium hydroxide (50% aqueous solution, 12 g) and 71 ml of water were added.

EXAMPLE 13

Preparation of acrylic acid/glycine, N-methyl-N-[2-hydroxy-3-(2-propenyloxy)propyl], monosodiumsalt copolymer Prepared as described in Example 12 utilizing glycine, N-methyl-N-[2-hydroxy-3(2-propenyloxy)-propyl]monosodium salt solution (Example 4, 56.29 g), water (106.22 g), isopropyl alcohol (31.32 g), sodium persulfate (20.5% aqueous solution, 20 g), acrylic acid (36.77 g), and tert-butylhydroperoxide (70% aqueous solution, 0.418 g). The addition period was lengthened to 5 hours. After distillation, sodium hydroxide (50% aqueous solution, 16 g) and 110 ml of water were added.

EXAMPLE 14

Preparation of acrylic acid/beta-alanine, N-(2-carboxyethyl)-N-[2-hydroxy-3-(2-propenyloxy)-propyl], disodium salt copolymer Prepared similarly to Example 10 utilizing beta-alanine, N-(2-carboxyethyl)-N-[2-hydroxy-3-(2-propenyloxy)propyl], disodium salt solution (example 6, 30.00 g), water (63.17 g), isopropyl alcohol (21.30 g), sodium persulfate (25% aqueous solution, 12.08 g), acrylic acid (23.34 g), tert-butylhydroperoxide (70% aqueous solution, 0.58 g), and sodium hydroxide (50% aqueous solution, 8.47 g). For this polymerization, the sodium hydroxide was charged simultaneously with the acrylic acid and the sodium persulfate solution; the addition period was shortened to 3 hours; the hold period was lengthened to 3 hours; and the tert-butylhydroperoxide was added 2 hours after addition. After distillation, 95 ml of water was added.

Example 15 illustrates the preparation of a copolymer of methacrylic acid with the product of Example 7.

EXAMPLE 15

Preparation of methacrylic acid/2-propanol, 1-(diethylamino)-3-(2-propenyloxy) copolymer 2-Propanol, 1-(diethylamino)-3-(2-propenyloxy) (Example 7, 16 g, 0.083 mole) and 171 ml DI water were charged to a suitable reactor and purged with nitrogen. Sodium persulfate (20.5% aqueous solution, 20 g) and methacrylic acid (44 g, 0.5 mole) were simultaneously added over a 4 hour period, maintaining a batch temperature of 90±2° C. 50% aqueous sodium hydroxide (7 g total) was charged during the addition period as needed to maintain polymer solubility. After addition, the batch was held at 90±2° C. for 1.5 hours. After the hold period, 50% sodium hydroxide (29 g) was charged, maintaining the batch temperature below 30° C.

Table II presents a summary of the physical properties of the copolymers produced in accordance with Examples 8–15.

TABLE II

Physical Properties of the Copolymers (g/h)

| Co-polymer | Monomer (g) | Monomer (h) | Charge Mole Ratio g:h | Brookfield[a] Viscosity | pH | Mn[b] |
|---|---|---|---|---|---|---|
| Ex 8 | Acrylic Acid | Ex 1 | 6:1 | 13.5 | 5.5 | 2,350 |
| Ex 9 | Acrylic Acid | Ex 1 | 6:1 | 15.6 | 5.5 | 3,200 |
| Ex 10 | Acrylic Acid | Ex 2 | 6:1 | 21.8 | 5.5 | 2,469 |
| Ex 11 | Acrylic Acid | Ex 2 | 4:1 | 26.3 | 5.7 | 2,350 |
| Ex 12 | Acrylic Acid | Ex 3 | 5:1 | 21.5 | 4.9 | 4,450 |
| Ex 13 | Acrylic Acid | Ex 4 | 5:1 | 17.5 | 5.1 | 4,200 |
| Ex 14 | Acrylic Acid | Ex 6 | 6:1 | 13.4 | 5.2 | — |
| Ex 15 | Methacrylic Acid | Ex 7 | 6:1 | 38.4 | 9.65 | — |

[a] 25% solutions @ 25° C.
[b] Number average molecular weight

Table III illustrates the excellent activity of the novel copolymers for deposit control in aqueous systems containing high levels of well water iron. The results are given as percent of soluble iron remaining in solution after specified times. The higher the percent soluble iron, the more effective the scale control of the polymer.

TABLE III

Deposit Control Activity
Well Water Iron Results
Percent Soluble Iron
Conditions: 200 ppm $Ca^{2+}$ as $CaCO_3$; 100 ppm $Mg^{2+}$ as $CaCO_3$;
8 ppm $Fe^{+2}$; pH 8; 45° C.; 0, 24, 48, 72 hour equilibration

| Treatment Copolymer | Treatment Conc. (ppm active) | 0 hour | 24 hour | 48 hour | 72 hour |
|---|---|---|---|---|---|
| Control | | 1.85 | 1.20 | 1.00 | 1.00 |
| Example 8 | 10.00 | 8.80 | 1.60 | 1.00 | 3.70 |
| | 20.00 | 96.20 | 96.30 | 81.60 | 96.20 |
| | 40.00 | 97.40 | 95.50 | 83.70 | 97.50 |
| Example 9 | 10.00 | 18.70 | 1.10 | 1.00 | 3.50 |
| | 20.00 | 96.60 | 96.10 | 82.42 | 97.20 |
| | 40.00 | 96.80 | 95.60 | 81.60 | 97.50 |
| Example 10 | 10.00 | 10.80 | 1.20 | 1.00 | 2.00 |
| | 20.00 | 95.50 | 70.90 | 22.70 | 35.60 |
| | 40.00 | 96.40 | 97.10 | 81.25 | 97.50 |
| Example 11 | 10.00 | 2.80 | 1.40 | 1.00 | 2.00 |
| | 20.00 | 96.30 | 71.80 | 79.10 | 88.30 |
| | 40.00 | 96.40 | 97.10 | 81.25 | 97.50 |

Table IV illustrates that the copolymers are effective in inhibiting the formation of calcium phosphate, commonly encountered in industrial water systems, such as cooling water systems.

TABLE IV

Calcium Phosphate Inhibition
Conditions: 600 ppm $Ca^{2+}$ as $CaCO_3$, 12 ppm $PO_4^{-3}$, 2 mM $NaHCO_3$, pH 7.0, 70° C., 18 hour equilibration
% Inhibition

| Treatment Copolymer | Treatment Concentrations (ppm active) | | |
|---|---|---|---|
| | 5 | 10 | 20 |
| Example 8 | 9.6 | 11.3 | 39.6 |
| 9 | 11.3 | 10.9 | 76.1 |
| 10 | 5.4 | 9.2 | 35.6 |
| 11 | 4.0 | 9.4 | 70.9 |
| 12 | 3.7 | 3.7 | 9.1 |
| 13 | 8.6 | 2.7 | 11.2 |
| 14 | 5.6 | 13.5 | 38.2 |

Table V demonstrates the excellent activity of the novel copolymers in inhibiting the formation of calcium carbonate, another commonly encountered scale-forming agent in various industrial water systems.

TABLE V

Calcium Carbonate Inhibition
Conditions: 1105 ppm $Ca^{2+}$ as $CaCO_3$, 1170 ppm $CO_3^{-2}$ as $CaCO_3$
pH 9.0, 70° C., 18 hours equilibration, LSI = 3.67
% Inhibition

| Treatment Copolymer | Treatment Concentrations (ppm active) | | |
|---|---|---|---|
| | 0.5 | 1.0 | 2.0 |
| Example 8 | 0.0 | 23.4 | 37.5 |
| 9 | 5.8 | 29.5 | 39.4 |
| 10 | 0.0 | 18.0 | 34.6 |
| 11 | 0.0 | 10.5 | 33.6 |
| 12 | 6.3 | 31.8 | 44.6 |
| 13 | 8.3 | 31.0 | 43.0 |
| 14 | 8.5 | 35.9 | 50.2 |

Tables VI and VII show that the copolymers are less effective in dispersing ferric oxide or montmorillonite clay.

TABLE VI

Ferric Oxide Dispersion
Conditions: 300 ppm $Fe_2O_3$, 200 ppm $Ca^{2+}$ as $CaCO_3$, 1 mM NaCl,
10 mM $NaHCO_3$, pH 7.0, 45° C., 18 hours settling
% Transmittance

| Treatment Copolymer | Treatment Concentrations (ppm active) | | |
|---|---|---|---|
| | 2.5 | 5.0 | 10.0 |
| Example 8 | 1.5 | 2.5 | 4.3 |
| 9 | 3.0 | 4.5 | 5.0 |
| 10 | 1.5 | 1.5 | 1.5 |
| 11 | 1.5 | 1.5 | 2.0 |
| 12 | 9.0 | 15.0 | 26.0 |
| 13 | 2.5 | 5.5 | 5.5 |
| 14 | 5.5 | 9.0 | 20.5 |

TABLE VII

Montmorillonite Dispersions
Conditions: 200 ppm $Ca^{2+}$ as $CaCO_3$, pH 7.0, 1000 ppm montmorillonite, 18 hours equilibration
% Transmittance

| Treatment Copolymer | Treatment Concentrations (ppm active) | | |
|---|---|---|---|
| | 5 | 10 | 20 |
| Example 8 | 0.0 | 0.0 | 0.0 |
| 9 | 0.0 | 0.0 | 0.0 |
| 10 | 0.0 | 0.0 | 0.0 |
| 11 | 0.0 | 0.0 | 0.0 |

Table VIII demonstrates the scale control in a boiler water system of a methacrylic acid copolymer (Example 15) in a phosphate precipitation program. Details of typical boiler test conditions can be found in U.S Pat. No. 4,659,481, col. 17.

TABLE VIII

Boiler Scale Reduction
Precipitating Phosphate Program
900 psig; 4 ppm Ca, 1 ppm Mg (as $CaCO_3$)
15 cycles

| Polymer | Conc. (ppm) | Deposit Weight Density (g/ft²) | % Scale Reduction |
|---|---|---|---|
| None | — | 8.15 | — |
| Ex. 15 | 2.5 | 0.99 | 88 |
| Ex. 15 | 5.0 | 0.22 | 97 |

% Scale reduction is calculated from the equation:
% Scale Reduction = $\frac{\text{DWD (control)} - \text{DWD (polymer)}}{\text{DWD (control)}}$
where DWD is Deposit Weight Density
control is the boiler test without polymer It is to be understood that the above boiler studies in no way limit the utility of the present invention for other boiler treatment programs, such as polymer/phosphate/chelant, coordinated phosphate, etc.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. Method of controlling the formation of scale imparting precipitates, and/or the subsequent deposition thereof on the structural parts of a system exposed to an aqueous medium containing scale forming constituents under scale forming conditions, said method comprising adding to said aqueous medium between 0.5 and about 100 parts per million on an actives basis of a water soluble polymer comprising repeat unit moieties (g) and (h) wherein said repeat unit (g) comprises the structure

and wherein said repeat unit moiety (h) comprises the structure:

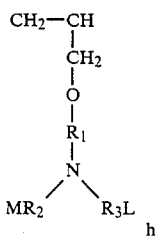

wherein E in the above formula is acrylic acid, methacrylic acid, or polymerized mixtures thereof, wherein $R_1$ in the above formula comprises a C1-C6 linear or branched alkylene or hydroxyl substituted alkylene, $R_2$ and $R_3$ independently represent hydrogen, C1-C5 lower alkylene or substituted lower alkylene, and M and L, independently represent hydrogen or a water-soluble cation and wherein the mole ratio of repeat units g:h is about 4:1 to about 6:1.

2. Method according to claim 1, wherein $R_1$ is an unsubstituted lower (C1-C6) alkylene group, or an hydroxyl substituted lower (C1-C6) alkylene group.

3. Method according to claim 2, wherein $R_1$ is a trimethylene ($-CH_2-CH_2-CH_2-$) group.

4. Method according to claim 2, wherein $R_1$ is a $-CH_2-CHOH-CH_2-$ group.

5. Method according to claim 1, wherein $R_2$ and $R_3$ are independently chosen from hydrogen, lower (C1-C5) alkyl, hydroxyl substituted lower (C1-C5) alkyl, or carboxy substituted lower (C1-C5) alkyl groups, and wherein M and L, are independently chosen from hydrogen or a water soluble cation.

6. Method according to claim 5, wherein $R_2$ and $R_3$ are both $-CH_2-COO-$, and M and L are both hydrogen.

7. Method according to claim 5, wherein $R_2$ and $R_3$ are both $-CH_2-COO-$, and M and L are both $Na^+$.

8. Method according to claim 5, wherein $R_2$ and $R_3$ are both $-CH2-CH2-$, and M and L are both hydrogen.

9. Method according to claim 1, wherein E is the repeat unit from the polymerization of acrylic acid, $R_1$ is $-CH_2-CHOH-CH_2-$, and $MR_2$ and $R_3L$ are both $-CH2-COOH$.

10. Method according to claim 1, wherein E is the repeat unit from the polymerization of methacrylic acid, $R_1$ is $-CH_2-CHOH-CH_2-$, and $MR_2$ and $R_3L$ are both $-CH_2-CH_3$.

11. Method according to claim 1, wherein the number-average molecular weight of the water soluble polymer is about 1,000 to about 1,000,000.

12. Method according to claim 1, wherein the number-average molecular weight of the water soluble polymer is about 1,500 to about 500,000.

13. Method according to claim 1, wherein the number-average molecular weight of the water soluble polymer is about 1,500 to about 25,000.

14. Method according to claim 1, further comprising adding to said aqueous system, an effective amount for the purpose of a topping agent selected from the group consisting of inorganic phosphoric acids and water soluble salts thereof, phosphonic acids and water soluble salts thereof, organic phosphoric acid esters and water soluble salts thereof, polyvalent metal salts, chromate compounds, azole compounds, and molybdate compounds.

15. Method according to claim 14, wherein said inorganic phosphoric acid is a member selected from the group consisting of orthophosphoric acid, primary phosphoric acid, secondary phosphoric acid, pyrophosphoric acid, tripolyphosphoric acid, trimetaphosphoric acid, tetrametaphosphoric acid, and water soluble salts thereof.

16. Method according to claim 14, wherein said phosphonic acid is a member selected from the group consisting of ethylenediaminetetramethylenephosphonic acid, methylenediphosphonic acid, hydroxyethylidenediphosphonic acid, and 2-phosphonobutane-1,2,4-tricarboxylic acid.

17. Method according to claim 14, wherein said polyvalent metal salt is a member selected from the group consisting of zinc chloride, nickel chloride, zinc sulfate, and nickel sulfate.

18. Method according to claim 14, wherein said chromate compound comprises a member selected from the group consisting of sodium chromate dihydrate, sodium chromate anhydrous, sodium chromate tetrahydrate, sodium chromate hexahydrate, sodium chromate decahydrate, potassium chromate, ammonium dichromate, and chromic acid.

19. Method according to claim 14, wherein said azole compound comprises a member selected from the group consisting of 1,2,3-tolyltriazole, benzotriazole, thiazole, mercaptothiazole, butylbenzotriazole, mercaptobenzothiazole, and benzothiazole.

20. Method according to claim 14, wherein said topping agent is added to said system in an amount of about 1 to about 500 parts per million parts of said system.

21. Method according to claim 1, wherein said scale imparting precipitates comprise a member selected from the group consisting of calcium phosphate, calcium carbonate, calcium phosphonate, calcium sulfate, calcium oxalate, barium sulfate, and zinc hydroxide.

22. Method according to claim 1, further comprising adding to said aqueous medium an effective amount for the purpose of a chelant and/or a water soluble phosphate generating compound.

23. Method according to claim 22, wherein said chelant is ethylendiaminetetraacetic acid, nitrilotriacetic acid, or hydroxyethylethylenediaminetetraacetic acid, and water soluble salts thereof.

24. Method according to claim 22, wherein said phosphate generating compound is an inorganic phospate salt.

25. Method according to claim 1, wherein said aqueous medium is a cooling water system.

26. Method according to claim 1, wherein said system is a steam generating system.

27. Method according to claim 1, wherein said system is a gas scrubbing system.

28. Method according to claim 1 wherein said system is a pulp and paper process system.

* * * * *